(12) United States Patent
    Asanuma

(10) Patent No.: US 12,586,802 B2
(45) Date of Patent: \*Mar. 24, 2026

(54) FUEL CELL SYSTEM

(71) Applicants: TOYOTA JIDOSHA KABUSHIKI KAISHA, Toyota (JP); AISAN KOGYO KABUSHIKI KAISHA, Obu (JP)

(72) Inventor: Daisaku Asanuma, Gamagori (JP)

(73) Assignees: TOYOTA JIDOSHA KABUSHIKI KAISHA, Toyota (JP); AISAN KOGYO KABUSHIKI KAISHA, Obu (JP)

( \* ) Notice: Subject to any disclaimer, the term of this patent is extended or adjusted under 35 U.S.C. 154(b) by 490 days.

This patent is subject to a terminal disclaimer.

(21) Appl. No.: 18/191,927

(22) Filed: Mar. 29, 2023

(65) Prior Publication Data

US 2023/0327157 A1    Oct. 12, 2023

(30) Foreign Application Priority Data

Apr. 11, 2022    (JP) ................................ 2022-065312

(51) Int. Cl.
    *H01M 8/04858*        (2016.01)
    *G05D 16/20*          (2006.01)
                (Continued)

(52) U.S. Cl.
    CPC .... *H01M 8/04895* (2013.01); *G05D 16/2022* (2019.01); *H01M 8/04089* (2013.01); *H01M 8/04201* (2013.01); *H01M 8/04388* (2013.01); *H01M 8/04574* (2013.01); *H01M 8/04753* (2013.01)

(58) Field of Classification Search
    None
    See application file for complete search history.

(56)                References Cited

U.S. PATENT DOCUMENTS

2010/0332038 A1    12/2010    Neu et al.
2012/0315559 A1    12/2012    Noh et al.
2023/0008243 A1     1/2023    Asanuma

FOREIGN PATENT DOCUMENTS

JP        2012-091577 A      5/2012
JP        2012255429 A      12/2012

OTHER PUBLICATIONS

Daisaku Asanuma, U.S. Appl. No. 18/191,923, Non-Final Office Action issued Oct. 1, 2025.

*Primary Examiner* — Jonathan Crepeau
(74) *Attorney, Agent, or Firm* — Dickinson Wright, PLLC

(57)                ABSTRACT

A fuel cell system may include a fuel cell; a hydrogen gas supply passage configured to supply hydrogen gas to the fuel cell; a solenoid valve configured to change an opening degree of the hydrogen gas supply passage; a pressure sensor configured to detect a pressure in a downstream supply passage which is a part of the hydrogen gas supply passage from the solenoid valve to the fuel cell; and a control circuit configured to control the solenoid valve. The control circuit may be configured to perform: detecting and storing a conducted electric current conducted in the solenoid valve and the pressure at plural points while changing the conducted electric current at a first sweep speed; and detecting and storing the conducted electric current and the pressure at plural points while changing the conducted electric current at a second sweep speed different from the first speed.

4 Claims, 4 Drawing Sheets

(51) Int. Cl.
  *H01M 8/04082*   (2016.01)
  *H01M 8/04089*   (2016.01)
  *H01M 8/0438*    (2016.01)
  *H01M 8/04537*   (2016.01)
  *H01M 8/04746*   (2016.01)

FUEL CELL SYSTEM

REFERENCE TO RELATED APPLICATIONS

This application claims priority from Japanese Patent Application No. 2022-065312 filed on Apr. 11, 2022. The entire content of the priority application is incorporated herein by reference.

BACKGROUND ART

The art disclosed herein relates to a fuel cell system.

Japanese Patent Application Publication No. 2012-091577 describes a solenoid valve configured to control a hydraulic pressure of brake fluid for a vehicle. A control circuit configured to control the solenoid valve stores an initial drive amount as an electric current value for driving the solenoid valve. The control circuit stores the initial drive amount according to a differential pressure between an upstream side and a downstream side of the solenoid valve. The control circuit firstly applies an electric current of the initial drive amount when the solenoid valve is activated.

There are variations in characteristics of solenoid valves. Also, a characteristic of a solenoid valve changes due to temperature and/or aging. In Japanese Patent Application Publication No. 2012-091577, the control circuit corrects the initial drive amount in regards to the variations in the characteristics of the solenoid valve. Specifically, the control circuit firstly controls the brake pressure to a target pressure (that is, a constant value). The electric current flowing in the solenoid valve is substantially constant, with the brake pressure being controlled to the target pressure. In this state, the control circuit measures the differential pressure of the brake pressure and the electric current flowing in the solenoid valve. Then, the control circuit corrects the stored initial drive amount based on the measured electric current. Such correction of the initial drive amount based on the characteristics of the solenoid valve allows for more precise control of the brake pressure.

In the art described in Japanese Patent Application Publication No. 2012-091577, with the brake pressure and the electric current flowing in the solenoid valve controlled at substantially constant values, the differential pressure of the brake pressure and the electric current are detected. The characteristics of the solenoid valve are however different in a dynamic state where the electric current flowing in the solenoid valve is changing from a static state where the electric current flowing in the solenoid valve is constant. The art of Japanese Patent Application Publication No. 2012-091577 does not allow for accurate learning of the solenoid valve characteristics in the state where the electric current flowing in the solenoid valve is changing (hereafter, may be termed dynamic characteristic). The present disclosure proposes art configured to allow for learning of dynamic characteristic of a solenoid valve that is used in a fuel cell system.

DESCRIPTION

A fuel cell system disclosed herein may comprise a fuel cell; a hydrogen gas supply passage configured to supply hydrogen gas to the fuel cell; a solenoid valve configured to change an opening degree of the hydrogen gas supply passage; a pressure sensor configured to detect a pressure in a downstream supply passage which is a part of the hydrogen supply gas passage from the solenoid valve to the fuel cell; and a control circuit configured to control the solenoid valve. The control circuit may be configured to perform: detecting and storing a conducted electric current conducted in the solenoid valve and the pressure at plural points while changing the conducted electric current at a first sweep speed; and detecting and storing the conducted electric current and the pressure at plural points while changing the conducted electric current at a second sweep speed different from the first speed.

The first sweep speed and the second sweep speed may be positive values (i.e., value which increases conducted electric current) or may be negative values (i.e., value which decreases conducted electric current). Also, the first sweep speed may be a positive value while the second sweep speed may be a negative value. In this case, an absolute value of the first sweep speed and an absolute value of the second sweep speed may be the same.

The control circuit may perform "detecting a conducted electric current conducted in the solenoid valve and the pressure at multiple points while changing the conducted current" before "detecting the conducted electric current and the pressure at multiple points while changing the conducted electric current at a second sweep speed different from the first speed", or in a reversed order thereof.

In this fuel cell system, the control circuit learns the dynamic characteristic of the solenoid valve at the first sweep speed by detecting the conducted electric current and the pressure while changing the conducted electric current of the solenoid valve at the first sweep speed. The control circuit further learns the dynamic characteristic of the solenoid valve at the second sweep speed different from the first sweep speed by detecting the conducted electric current and the pressure while changing the conducted electric current of the solenoid valve at the second sweep speed. As such, this fuel cell system allows for learning of the solenoid valve dynamic characteristic for each sweep speed.

BRIEF DESCRIPTION OF DRAWINGS

FIG. 1 illustrates a block diagram of a fuel cell system.

Figure 2:
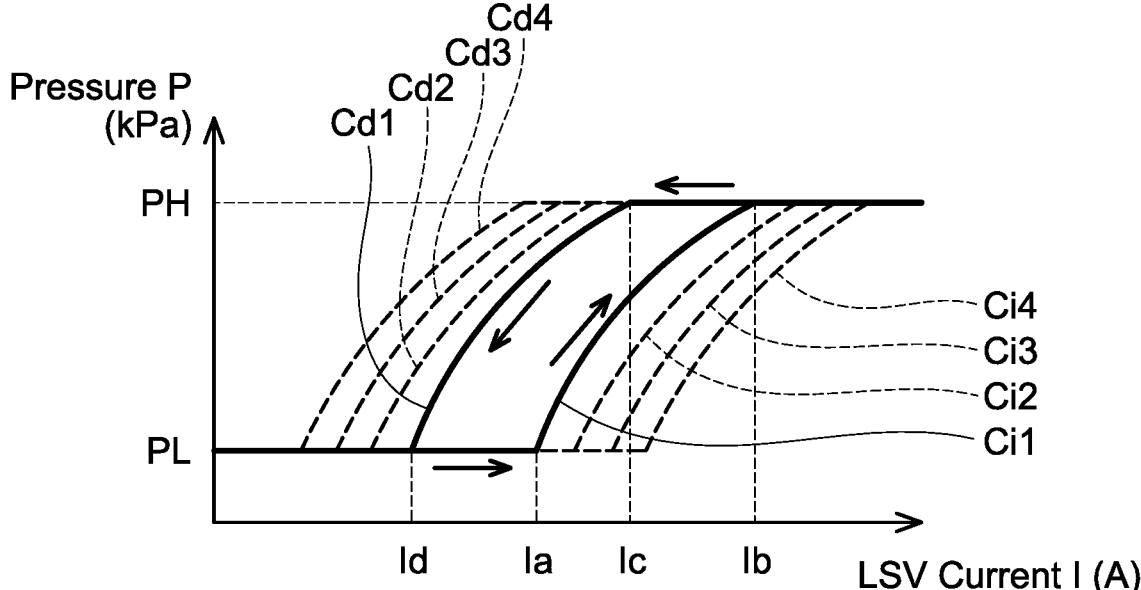
FIG. 2 illustrates a graph indicating dynamic characteristic of a LSV for respective sweep speeds.

In an example of the fuel cell system disclosed herein, changing the conducted electric current at the first sweep speed may comprise the control circuit increasing the conducted electric current at the first sweep speed from a state where the solenoid valve is closed. Changing the conducted electric current at the second sweep speed may comprise the control circuit increasing the conducted electric current at the second sweep speed from the state where the solenoid valve is closed.

According to such configuration, the dynamic characteristic of the solenoid valve when the conducted electric current is increased can be learned at different sweep speeds.

In an example of the fuel cell system disclosed herein, changing the conducted electric current at the first sweep speed may comprise the control circuit decreasing the conducted electric current at the first sweep speed from a state where the solenoid valve is open. Changing the conducted electric current at the second sweep speed may comprise the control circuit decreasing the conducted electric current at the second sweep speed from the state where the solenoid valve is open.

According to such configuration, the dynamic characteristic of the solenoid valve when the conducted electric current is decreased can be learned at different sweep speeds.

In an example of the fuel cell system disclosed herein, the first sweep speed may be a positive value which increases the conducted electric current, and the second sweep speed may be a negative value which decreases the conducted electric current. Changing the conducted electric current at the first sweep speed may comprise the control circuit increasing the conducted electric current at the first sweep speed from a state where the solenoid valve is closed. Changing the conducted electric current at the second sweep speed may comprise the control circuit decreasing the conducted electric current at the second sweep speed from a state where the solenoid valve is open.

According to such configuration, the dynamic characteristic of the solenoid valve when the conducted electric current is increased and the dynamic characteristic of the solenoid valve when the conducted electric current is decreased can be learned at different sweep speeds.

EMBODIMENTS

Figure 1:
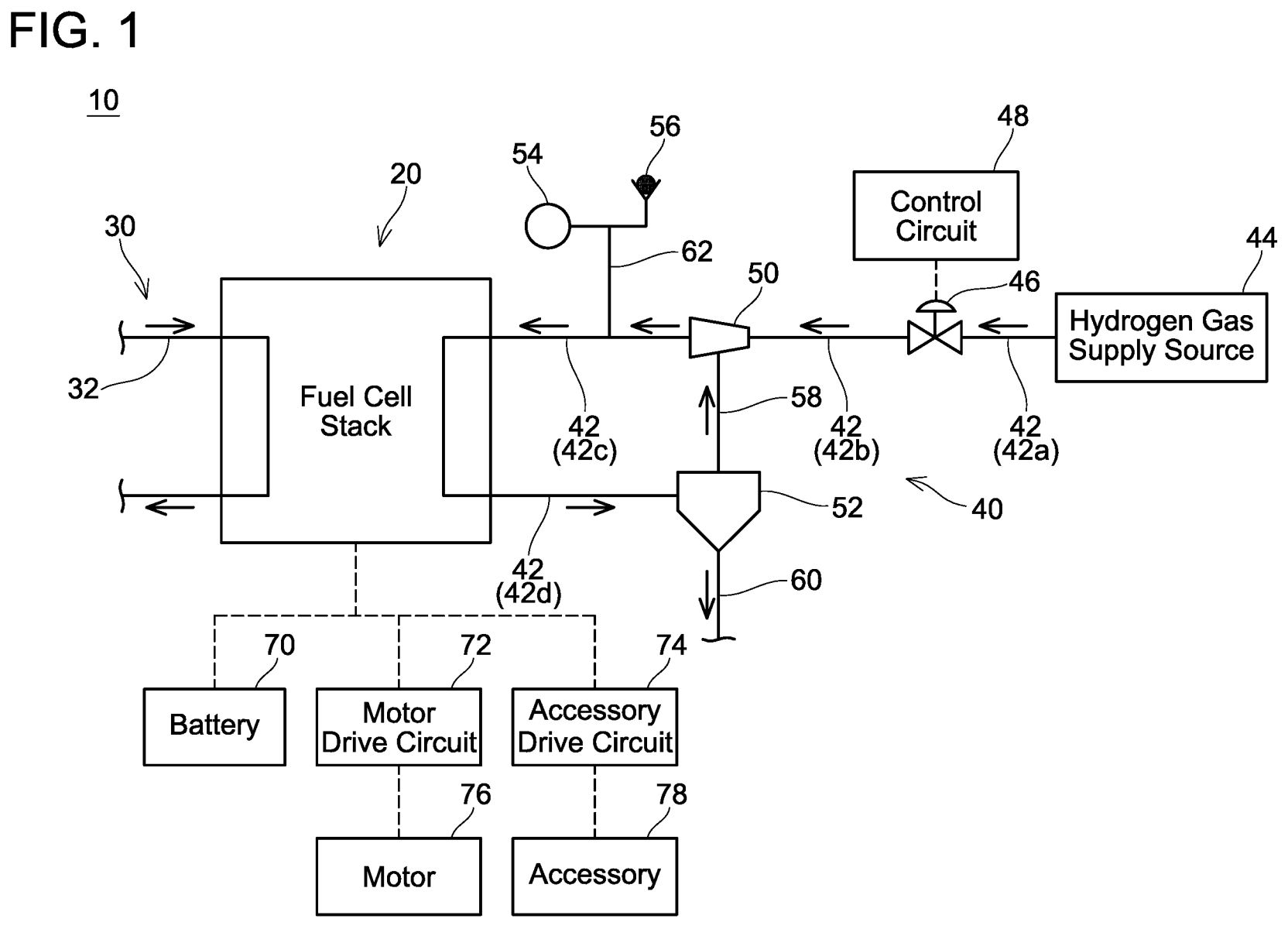

A fuel cell system 10 according to an embodiment shown in FIG. 1 is mounted in an electric vehicle. The electric vehicle comprises a motor 76. The motor 76 is configured to rotate drive wheel(s) by operating using power generated by the fuel cell system 10.

The fuel cell system 10 comprises a fuel cell stack 20, an oxygen gas supply device 30, and a hydrogen gas supply device 40. The fuel cell stack 20 is a stack of a plurality of fuel cells. The oxygen gas supply device 30 comprises an oxygen gas supply path 32 routed through the fuel cell stack 20. The oxygen gas supply path 32 allows oxygen gas to be supplied to the fuel cell stack 20. The hydrogen gas supply device 40 comprises a hydrogen gas supply path 42 routed through the fuel cell stack 20. The hydrogen gas supply path 42 allows hydrogen gas to be supplied to the fuel cell stack 20. The oxygen gas supplied by the oxygen gas supply path 32 and the hydrogen gas supplied by the hydrogen gas supply path 42 react with each other in the fuel cell stack 20, by which power is generated in the fuel cell stack 20.

A battery 70, a motor drive circuit 72, and an accessory drive circuit 74 are electrically coupled to the fuel cell stack 20. An output electric current from the fuel cell stack 20 is supplied to the battery 70, by which the battery 70 is charged. The motor drive circuit 72 operates by receiving the supply of power from the fuel cell stack 20 or the battery 70. The motor drive circuit 72 drives the motor 76 by converting direct current voltage supplied from the fuel cell stack 20 or the battery 70 into alternate current voltage and supplying the same to the motor 76. The accessory drive circuit 74 operates by receiving supply of power from the fuel cell stack 20 or the battery 70. The accessory drive circuit 74 drives an accessory 78 by converting direct current voltage supplied from the fuel cell stack 20 or the battery 70 to a lower voltage and supplying the same to the accessory 78.

The hydrogen gas supply device 40 comprises a hydrogen gas supply source 44, a linear solenoid valve 46 (hereafter "LSV 46"), a control circuit 48, an ejector 50, a gas-liquid separator 52, a pressure sensor 54, and an exhaust valve 56. The hydrogen gas supply source 44 is coupled to an upstream end of the hydrogen gas supply path 42. The hydrogen gas supply source 44 is composed of a hydrogen gas tank, for example. The hydrogen gas supply source 44 supplies high-pressure hydrogen gas to the hydrogen gas supply path 42.

The LSV 46 and the ejector 50 are arranged on the hydrogen gas supply path 42. The ejector 50 is arranged on the hydrogen gas supply path 42 on the downstream side of the LSV 46. Also, on the downstream side of the ejector 50, the hydrogen gas supply path 42 extends within the fuel cell stack 20. The hydrogen gas supplied from the hydrogen gas supply source 44 extends through the LSV 46, the ejector 50, and the fuel cell stack 20 sequentially in this order. Hereafter, a part of the hydrogen gas supply path 42 that is upstream of the LSV 46 will be termed "supply path 42a". Further, a part of the hydrogen gas supply path 42 that is between the LSV 46 and the ejector 50 will be termed "supply path 42b". Hereafter, a part of the hydrogen gas supply path 42 that is between the ejector 50 and the fuel cell stack 20 will be termed "supply path 42c". Hereafter, a part of the hydrogen gas supply path 42 that is downstream of the fuel cell stack 20 will be termed "supply path 42d".

The LSV 46 is a valve configured to open/close the hydrogen gas supply path 42. The LSV 46 is electrically coupled to the control circuit 48. The control circuit 48 controls electric current that flows in the LSV 46 (hereafter, LSV current I). An opening degree of the LSV 46 changes according to the LSV current I. The LSV 46 is closed in a state where the LSV current I is not flowing. The higher the LSV current I, the greater the opening degree of the LSV 46. The hydrogen gas flows from the supply path 42a through the LSV 46 to the supply path 42b in a state where the LSV 46 is open.

An off-gas circulation path 58 is coupled to the ejector 50. An off-gas, which is the hydrogen gas after having passed through the fuel cell stack 20, flows in the off-gas circulation path 58. The off-gas is supplied from the off-gas circulation path 58 to the ejector 50. The ejector 50 adds the off-gas to the hydrogen gas supplied from the supply path 42b and ejects the same to the supply path 42c.

The hydrogen gas ejected from the ejector 50 to the supply path 42c flows into the fuel cell stack 20. The hydrogen gas reacts with the oxygen gas within the fuel cell stack 20. The hydrogen gas having passed though the fuel cell stack 20 (that is, off-gas) flows from the fuel cell stack 20 into the supply path 42d.

The gas-liquid separator 52 is coupled to a downstream end of the supply path 42d. The off-gas circulation path 58 and an exhaust path 60 are coupled to the gas-liquid separator 52. The gas-liquid separator 52 removes moisture from the off-gas supplied from the supply path 42d. The gas-liquid separator 52 discharges the moisture and the residual off-gas outside of the fuel cell system 10 through the exhaust path 60. Further, the gas-liquid separator 52 supplies the off-gas from which the moisture has been removed to the off-gas circulation path 58. As such, as mentioned above, the off-gas is supplied from the off-gas circulation path 58 to the ejector 50.

A branch path 62 is coupled to the supply path 42c. The branch path 62 comprises the pressure sensor 54 and the exhaust valve 56. When the exhaust valve 56 is open, the branch path 62 connects to outside (that is, air). When the exhaust valve 56 is closed, pressure of the hydrogen gas within the branch path 62 is equal to pressure of the hydrogen gas within the supply path 42c. The pressure sensor 54 detects the pressure within the branch path 62. The pressure detected by the pressure sensor 54 is equal to the pressure within the supply path 42c in the state where the exhaust valve 56 is closed.

The control circuit 48 opens the LSV 46 at a predetermined opening degree when power is generated in the fuel cell system 10. Due to this, the hydrogen gas supply path 42 allows the hydrogen gas to be supplied to the fuel cell stack 20. Also, the oxygen gas supply path 32 allows the oxygen gas to be supplied to the fuel cell stack 20. The hydrogen gas and the oxygen gas react each other within the fuel cell stack 20, thereby generating power. The power generated in the fuel cell stack 20 is supplied to the battery 70, the motor drive circuit 72, or the accessory drive circuit 74 according to necessities.

FIG. 2 illustrates dynamic characteristics of the LSV 46. An axis of abscissas in FIG. 2 indicates the LSV current I, and an axis of ordinates in FIG. 2 indicates a pressure P within the supply path 42c. Here, the pressure P is equal to the pressure detected by the pressure sensor 54 in the state where the exhaust valve 56 is closed. A dynamic characteristic Ci1 in FIG. 2 shows the dynamic characteristic of the LSV 46 when the LSV current I is increased at a sweep speed V1 (A/sec). The dynamic characteristic Cd1 in FIG. 2 shows the dynamic characteristic of the LSV 46 when the LSV current I is decreased at a sweep speed –V1 (A/sec). Here, an absolute value of the sweep speed V1 and an absolute value of the sweep speed –V1 are equal to each other. As shown in FIG. 2, the dynamic characteristic Ci1 when the LSV current I increases and the dynamic characteristic Cd1 when the LSV current I decreases are different from each other. In other words, the LSV 46 has hysteresis characteristics.

Firstly, the dynamic characteristic Ci1 will be described. While the LSV current I is zero, the LSV 46 is in full-closed state where the hydrogen gas does not flow in the hydrogen gas supply path 42. In this state, the pressure P takes a minimum PL. When the LSV current I is lower than a current Ia in the case where the LSV current I is increased, the LSV 46 is maintained in the full-closed state and the pressure P is maintained at the minimum PL. Once the LSV current I has increased to the current Ia, the LSV 46 starts to open, by which the pressure P starts to rise. Hereafter, the current Ia upon when the pressure P starts to rise may be termed "rising current Ia". Once the LSV current I has exceeded the rising current Ia, the opening degree of the LSV 46 increases along with the increasing LSV current I, by which the pressure P increases. Once the LSV current I has increased to a current Ib, the LSV 46 is in full-open state, by which the pressure P takes a maximum PH. Even when the LSV current I has exceeded the current Ib, the pressure P does not rise above from the maximum PH.

Next, the dynamic characteristic Cd1 will be described. While the LSV current I is higher than the current Ib, the LSV 46 is in full-open state and the pressure P takes the maximum PH. In the case where the LSV current I is decreased, the LSV 46 is maintained in the full-open state even when the LSV current I has decreased to the current Ib. In the case where the LSV current I is decreased, the LSV 46 starts to close and the pressure P starts to drop once the LSV current I has decreased to a current Ic which is lower than the current Ib. Hereafter, the current Ic upon when the pressure P starts to drop may be termed "falling current Ic". Once the LSV current I has fallen below the falling current Ic, the opening degree of the LSV 46 decreases along with the decreasing LSV current I, by which the pressure P decreases. In the case where the LSV current I is decreased, once the LSV current I has decreased to a current Id which is lower than the rising current Ia, the LSV 46 is in the full-closed state, by which the pressure P takes the minimum PL.

Dynamic characteristics Ci2 to Ci4 in FIG. 2 indicate dynamic characteristics of the LSV 46 when the LSV current I is increased at different sweep speeds different from the sweep speed V1 of the dynamic characteristic Ci1. The dynamic characteristic Ci2 is the dynamic characteristic when the LSV current I is increased at a sweep speed V2, the dynamic characteristic Ci3 is the dynamic characteristic when the LSV current I is increased at a sweep speed V3, and the dynamic characteristic Ci4 is the dynamic characteristic when the LSV current I is increased at a sweep speed V4. The sweep speeds V1 to V4 satisfy V1<V2<V3<V4. As shown in FIG. 2, as the sweep speed becomes higher, the graph shifts rightward, which means that the LSV current I required for raising the pressure P becomes higher. For example, as the sweep speed becomes higher, a rising current Ia becomes higher. As such, the dynamic characteristic of the LSV46 when the LSV current I increases varies according to the sweep speed.

Dynamic characteristics Cd2 to Cd4 in FIG. 2 indicate dynamic characteristics of the LSV 46 when the LSV current I is decreased at different sweep speeds different from the sweep speed –V1 of the dynamic characteristic Cd1. The dynamic characteristic Cd2 is the dynamic characteristic when the LSV current I is decreased at a sweep speed –V2, the dynamic characteristic Cd3 is the dynamic characteristic when the LSV current I is decreased at a sweep speed –V3, and the dynamic characteristic Cd4 is the dynamic characteristic when the LSV current I is decreased at a sweep speed –V4. The sweep speeds –V1 to –V4 satisfy –V4<–V3<–V2<–V1. In other words, the sweep speed –V1 means that the LSV current I is decreased at a slowest decreasing speed among the speeds –V1 to –V4, whereas the sweep speed –V4 means that the LSV current I is decreased at a fastest decreasing speed among the speeds –V1 to –V4. As shown in FIG. 2, as the decreasing speed of the LSV current I becomes faster, the graph shifts leftward, which means that the LSV current I required for lowering the pressure P becomes lower. For example, as the decreasing speed of the LSV current I becomes higher, a falling current Ic becomes lower. As such, the dynamic characteristic of the LSV46 when the LSV current I decreases varies according to the sweep speed.

There are variations in dynamic characteristics of the LSVs 46 due to manufacture error and/or aging, for example. The control circuit 48 performs learning process of measuring and storing the dynamic characteristic of the LSV 46. Hereinafter, the learning process performed by the control circuit 48 will be described. An exhaust valve 56 remains closed while the learning process to be described below is performed. As such, the pressure P within the supply path 42c is detected by the pressure sensor 54 while the learning process to be described below is performed.

Figure 3:
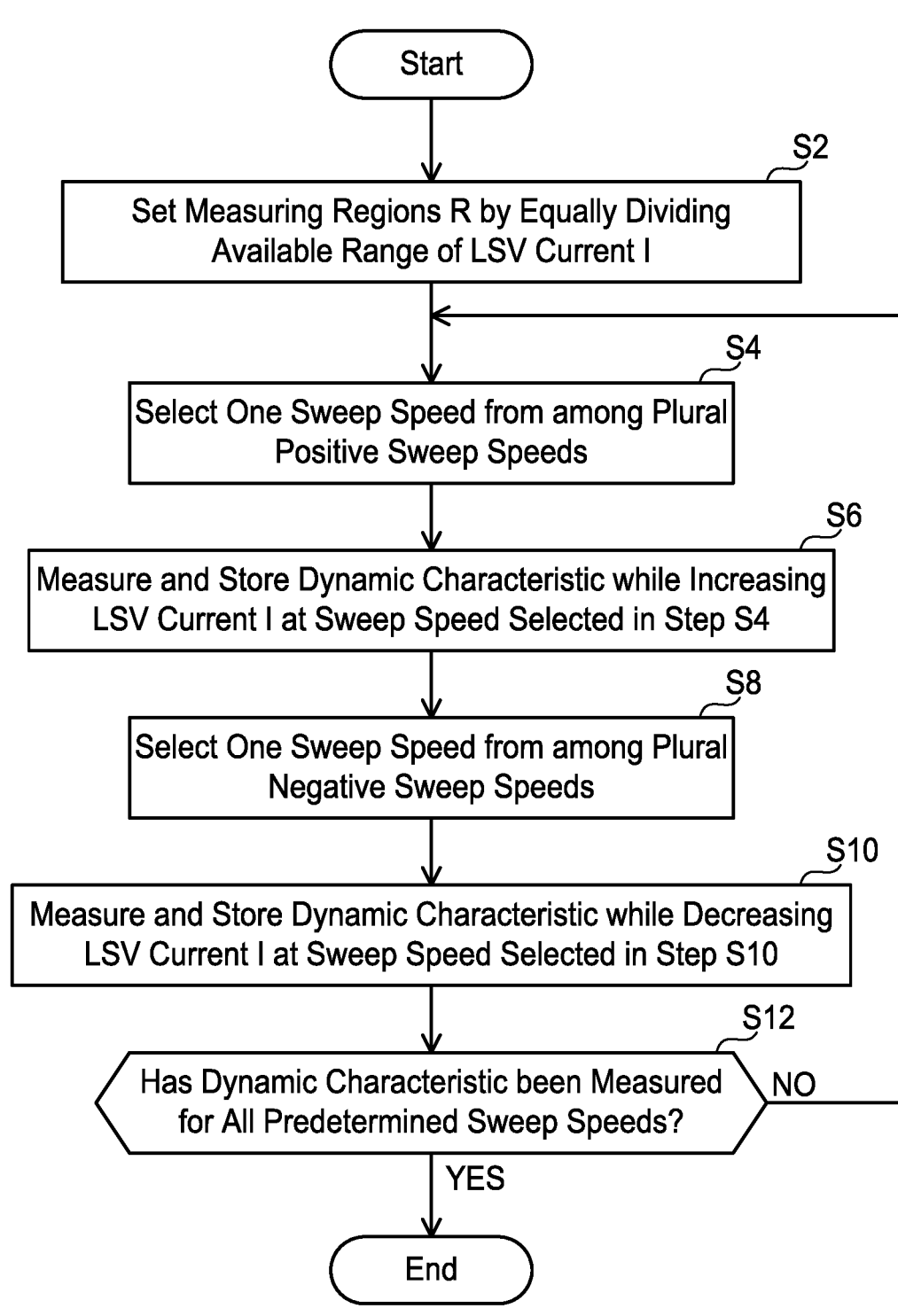
FIG. 3 illustrates a flowchart of a learning process.

FIG. 3 indicates the learning process. The control circuit 48 performs the learning process in a case where the learning process has yet to be performed. By the control circuit 48 performing the learning process, the dynamic characteristic of the LSV 46 can be specified even when the dynamic characteristic of the LSV 46 deviates from a design value of the dynamic characteristic. Also, even when the learning process has been performed, the control circuit 48 may perform the learning process shown in FIG. 3 periodically. The periodical learning process by the control circuit 48 may allow the dynamic characteristic of the LSV 46 to be accurately specified even if aging affects the dynamic characteristic of the LSV 46.

Figure 4:
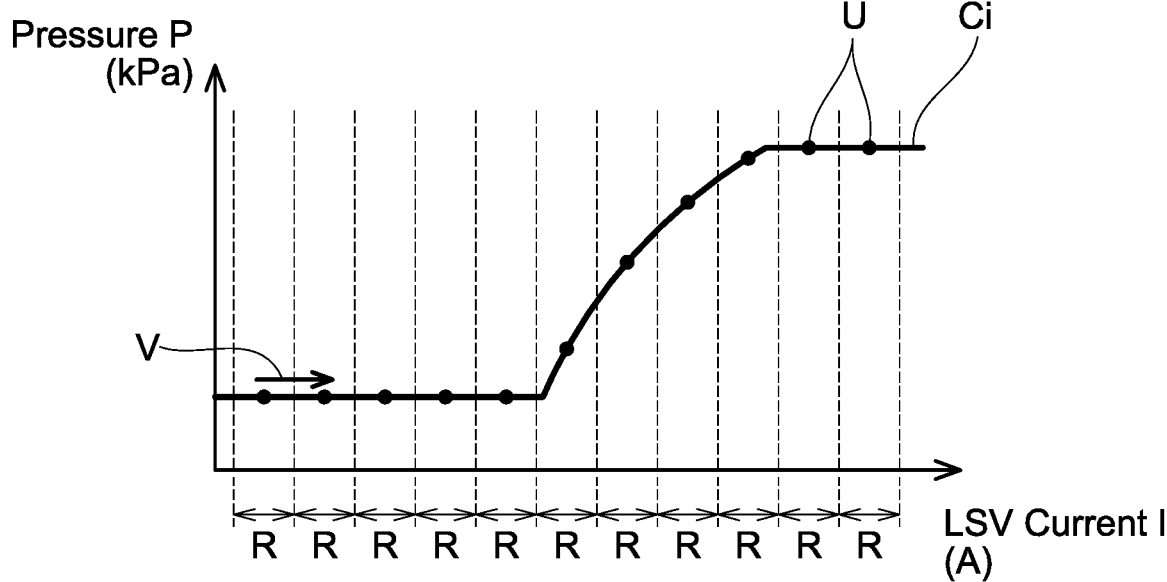
FIG. 4 illustrates a graph indicating measurement of the dynamic characteristic when a LSV current increases.
Figure 5:
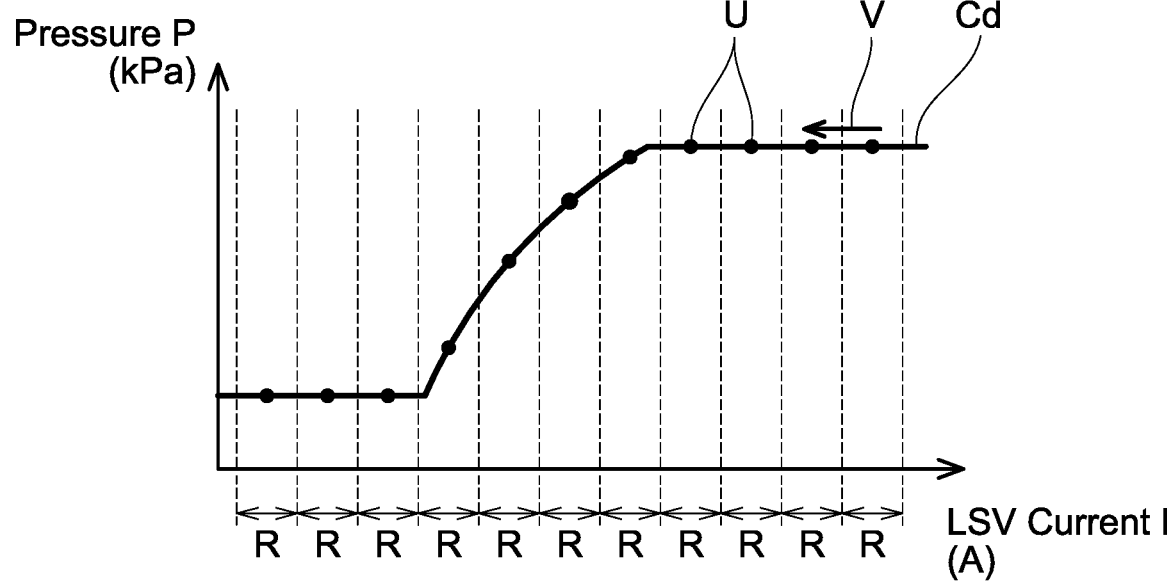
FIG. 5 illustrates a graph indicating measurement of the dynamic characteristic when the LSV current decreases.

In step S2, the control circuit 48 sets measuring regions R by dividing an available range of the LSV current I at equal intervals as shown in FIGS. 4, 5.

Next, the control circuit 48 repeats steps S4 to S12. In step S4, the control circuit 48 selects a sweep speed V of the LSV current I. Here, the control circuit 48 selects one sweep speed from among plural predetermined positive sweep speeds (e.g., sweep speeds V1 to V4).

In step S6, the control circuit 48 measures the dynamic characteristic of the LSV 46 while increasing the LSV current I at the sweep speed V that was selected in the immediate previous step S4. More specifically, the control circuit 48 monitors the pressure P detected by the pressure sensor 54 while increasing the LSV current I at the sweep speed V selected in step S4. At this occasion, the control circuit 48 measures and stores the LSV current I and the pressure P at each measuring region R which was set in step S2. FIG. 4 shows changes of the LSV current I and the pressure P when step S6 is performed at the sweep speed V. As shown in FIG. 4, each range of the equally-divided available ranges of the LSV current I is set as the measuring region R. As shown in FIG. 4, the control circuit 48 increases the LSV current I from 0 A at the sweep speed V. The control circuit 48 measures and stores the LSV current I and the pressure P at that time when the LSV current I is a value within each measuring region. For example, the control circuit 48 may measure and store the LSV current I and the pressure P at that time when the LSV current I is a median in each measuring region R. Alternatively, the control circuit 48 may measure the LSV current I and the pressure P at plural times within one measuring region R and store its average value or median value of those plural measured values as the LSV current I and the pressure P of that measuring region R. As such, the control circuit 48 stores respective coordinate points U shown in FIG. 4 by the control circuit 48 storing the LSV current I and the pressure P in the respective measuring regions R. The control circuit 48 specifies a dynamic characteristic Ci of the LSV 46 when the LSV current I is increased, based on the respective coordinate points U. For example, the control circuit 48 may specify the dynamic characteristic Ci of the LSV 46 by connecting the respective coordinate points U with a straight line or a curve. Alternatively, the control circuit 48 may specify the dynamic characteristic Ci of the LSV 46 by calculating an approximate curve based on the respective coordinate points U.

Further, in step S6, hydrogen is supplied to the fuel cell stack 20 while the pressure P is greater than the minimum PL. In step S6, the control circuit 48 supplies oxygen to the fuel cell stack 20 with the oxygen gas supply device 30, accompanying the hydrogen being supplied to the fuel cell stack 20. As such, power is generated in the fuel cell stack 20. Power generated in the fuel cell stack 20 is supplied to the battery 70. As such, the battery 70 is charged. Here, if the motor 76 or the accessory 78 demands power, the power generated in the fuel cell stack 20 may be supplied to the motor 76 or the accessory 78.

In step S8, the control circuit 48 selects the sweep speed V of the LSV current I. Here, the control circuit 48 selects one sweep speed from among plural predetermined negative sweep speeds (e.g., sweep speeds −V1 to −V4).

In step S10, the control circuit 48 measures the dynamic characteristic of the LSV 46 while decreasing the LSV current I at the sweep speed V which was selected in the immediate previous step S8. More specifically, the control circuit 48 monitors the pressure P detected by the pressure sensor 54 while decreasing the LSV current I at the sweep speed V selected in step S8. At this occasion, the control circuit 48 measures the LSV current I and the pressure P in each measuring region R set in step S2. FIG. 5 shows changes in the LSV current I and the pressure P when step S10 is performed at the sweep speed V (e.g., sweep speed −V1, −V2, −V3, or −V4). As shown in FIG. 5, the control circuit 48 decreases the LSV current I from the maximum at the sweep speed V. The control circuit 48 measures and stores the LSV current I and the pressure P at that time when the LSV current I is a value within each measuring region R. As such, the control circuit 48 stores respective coordinate points U shown in FIG. 5 by the control circuit 48 storing the LSV current I and the pressure P in the respective measuring regions R. The control circuit 48 specifies a dynamic characteristic Cd of the LSV 46 when the LSV current I is decreased, based on the respective coordinate points U.

Further, in step S10, hydrogen is supplied to the fuel cell stack 20 while the pressure P is greater than the minimum PL. In step S10, the control circuit 48 supplies oxygen to the fuel cell stack 20 with the oxygen gas supply device 30, accompanying the hydrogen being supplied to the fuel cell stack 20. As such, power is generated in the fuel cell stack 20. Power generated in the fuel cell stack 20 is supplied to the battery 70, for example.

In step S12, the control circuit 48 determines whether the dynamic characteristic upon when the LSV current I changes has been measured for all the plural predetermined sweep speeds (e.g., sweep speeds V1 to V4 and −V1 to −V4). If there is left one or more sweep speeds for which the dynamic characteristic upon when the LSV current I changes has yet to be measured (i.e., NO in step S12), the control circuit 48 conducts steps S4 to S12 again. In step S4 in a second or subsequent round, the control circuit 48 selects one sweep speed from among the sweep speed(s) for which the dynamic characteristic upon when the LSV current I increases has yet to be measured. Further, in step S8 in the second or subsequent round, the control circuit 48 selects one sweep speed from among the sweep speed(s) for which the dynamic characteristic upon when the LSV current I decreases has yet to be measured. As such, the control circuit 48 measures the dynamic characteristic upon when the LSV current I changes for all the predetermined positive sweep speeds (e.g., sweep speeds V1 to V4) and all the predetermined negative sweep speeds (e.g., sweep speeds −V1 to −V4), by repeating steps S4 to S12 plural times. For example, actual measured values of the dynamic characteristics Ci1 to Ci4 and Cd1 to Cd4 of FIG. 2 are measured and stored by the control circuit 48.

The control circuit 48 performing the above-described learning process allows the control circuit 48 to be in a state storing the dynamic characteristics upon when the LSV current I increases at the plural sweep speeds and the dynamic characteristics upon when the LSV current I decreases at the plural sweep speeds. After the learning process, the control circuit 48 controls the LSV 46 according to the stored dynamic characteristics. For example, while a vehicle is running, a target value of the pressure P is inputted to the control circuit 48 in accordance with a target power generation amount of the fuel cell stack 20. The control circuit 48 then calculates the sweep speed in accordance with the target value of the pressure P and the electric current value of the pressure P. The control circuit 48 further selects one suitable dynamic characteristic from among the stored dynamic characteristics (e.g., Ci1 to Ci4, Cd1 to Cd4) based on the calculated sweep speed. For example, when the calculated sweep speed is a positive value, the control circuit 48 selects one dynamic characteristic according to its sweep speed from among the dynamic characteristics Ci upon when the LSV current I is increased. For example, when the calculated sweep speed is a negative value, the control circuit 48 selects one dynamic characteristic according to its sweep speed from among the dynamic characteristics Cd upon when the LSV current I is decreased. After the dynamic characteristic has been selected, the control circuit 48 calculates a target value of the LSV current I based on the selected dynamic characteristic and the target value of the pressure P. Thereafter, the control circuit 48 changes the LSV current I to the target value at the calculated sweep speed. Since the dynamic characteristics stored by the control circuit 48 are the dynamic characteristics that were measured actually in the learning process, the control circuit 48 is able to control the pressure P to the target value by controlling the LSV current I as mentioned above. Further, since the dynamic characteristics were measured for the respective sweep speeds in the learning process, the control circuit 48 is able to control the LSV current I by allowing the LSV current I to follow changes due to the sweep speed of the dynamic characteristic. For example, when the pressure P is raised, the pressure P can be accurately controlled without being affected by the difference between the dynamic characteristic when the sweep speed is fast and the dynamic characteristic when the sweep speed is slow. For example, when the pressure P is lowered, the pressure P can be accurately controlled without being affected by the difference between the dynamic characteristic when the sweep speed is fast and the dynamic characteristic when the sweep speed is slow. Also, when the pressure P is changed, the pressure P can be accurately controlled without being affected by the difference between the dynamic characteristic when the pressure P is raised and the dynamic characteristic when the pressure P is lowered (that is, without being affected by the hysteresis characteristic). As such, according to the fuel cell system 10 according to the embodiment, the pressure P of the hydrogen gas supplied to the fuel cell stack 20 can be more accurately controlled than it was.

In the above-described embodiment, the dynamic characteristic upon when the LSV current I is increased and the dynamic characteristic upon when the LSV current I is decreased were alternately measured. Alternately, plural dynamic characteristics upon when the LSV current I is decreased may be measured after plural dynamic characteristics upon when the LSV current I is increased have been measured.

In the above embodiment, the dynamic characteristics were measured at the plural sweep speeds when the LSV current I is increased and also the dynamic characteristics were measured at the plural sweep speeds when the LSV current I is decreased. In another embodiment however, the dynamic characteristics may be measured at the plural sweep speeds when the LSV current I is increased but the dynamic characteristics may not be measured when the LSV current I is decreased. Even according to such configuration, the pressure P can be accurately controlled when the LSV current I is increased. Further, in yet another embodiment, the dynamic characteristics may be measured at the plural sweep speeds when the LSV current I is decreased but the dynamic characteristics may not be measured when the LSV current I is increased. Even according to such configuration, the pressure P can be accurately controlled when the LSV current I is decreased. In yet another embodiment, the dynamic characteristic may be measured at one sweep speed when the LSV current I is increased and also the dynamic characteristic may be measured at one sweep speed when the LSV current I is decreased. In this case, the absolute value of the sweep speed upon when the LSV current I is increased (i.e., positive sweep speed) and the absolute value of the sweep speed upon when the LSV current I is decreased (i.e., negative sweep speed) may be equal. According to such configuration also, the pressure P can be controlled without being affected by the hysteresis characteristic.

In the above embodiment, the control of the LSV 46 is described. Alternatively, another type of solenoid valve (e.g., rotary solenoid valve) may be used instead of the LSV 46.

In the above embodiment, the fuel cell system mounted in an electric vehicle is described. Alternatively, the art disclosed herein may be applied to another type of fuel cell system such as a stationary type.

In the above embodiment, the number of the measuring points at which the LSV current I and the pressure P are measured while the dynamic characteristic is measured is preferably three or more, and more preferably five or more.

If the plural dynamic characteristics upon when the LSV current I is increased are focused on, the sweep speed V1 in the embodiment is an example of "first sweep speed", and the sweep speeds V2 to V4 in the embodiment are an example of "second sweep speed". If the plural dynamic characteristics upon when the LSV current I is decreased are focused on, the sweep speed −V1 in the embodiment is an example of the "first sweep speed", and the sweep speeds −V2 to −V4 in the embodiment are an example of the "second sweep speed". If the plural dynamic characteristics upon when the LSV current I is increased and the plural dynamic characteristics upon when the LSV current I is decreased are focused on, the sweep speed V1 in the embodiment is an example of the "first sweep speed", and the sweep speeds −V2 to −V4 in the embodiment are an example of the "second sweep speed".

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A fuel cell system, comprising:
   a fuel cell;
   a hydrogen gas supply passage configured to supply hydrogen gas to the fuel cell;
   a solenoid valve configured to change an opening degree of the hydrogen gas supply passage;
   a pressure sensor configured to detect a pressure in a downstream supply passage which is a part of the hydrogen gas supply passage from the solenoid valve to the fuel cell; and
   a control circuit configured to control the solenoid valve, wherein
   the control circuit is configured to perform:
   detecting and storing a conducted electric current conducted in the solenoid valve and the pressure at plural points while changing the conducted electric current at a first sweep speed;

detecting and storing the conducted electric current and the pressure at plural points while changing the conducted electric current at a second sweep speed different from the first speed; and controlling the solenoid valve based on the stored electric currents and pressures.

2. The fuel cell system of claim 1, wherein changing the conducted electric current at the first sweep speed comprises the control circuit increasing the conducted electric current at the first sweep speed from a state where the solenoid valve is closed, and changing the conducted electric current at the second sweep speed comprises the control circuit increasing the conducted electric current at the second sweep speed from the state where the solenoid valve is closed.

3. The fuel cell system of claim 1, wherein changing the conducted electric current at the first sweep speed comprises the control circuit decreasing the conducted electric current at the first sweep speed from a state where the solenoid valve is open, and changing the conducted electric current at the second sweep speed comprises the control circuit decreasing the conducted electric current at the second sweep speed from the state where the solenoid valve is open.

4. The fuel cell system of claim 1, wherein the first sweep speed is a positive value which increases the conducted electric current, the second sweep speed is a negative value which decreases the conducted electric current, changing the conducted electric current at the first sweep speed comprises the control circuit increasing the conducted electric current at the first sweep speed from a state where the solenoid valve is closed, and changing the conducted electric current at the second sweep speed comprises the control circuit decreasing the conducted electric current at the second sweep speed from a state where the solenoid valve is open.

* * * * *